United States Patent [19]
Boler

[11] 3,760,946
[45] Sept. 25, 1973

[54] COMBINATION SEWAGE TREATMENT AND COOLING SYSTEM

[75] Inventor: Leonard J. Boler, Minneapolis, Minn.

[73] Assignee: Cherne Industrial, Inc., Edina, Minn.

[22] Filed: Mar. 31, 1971

[21] Appl. No.: 129,672

[52] U.S. Cl............... 210/152, 210/7, 210/12, 210/14, 210/170, 210/195, 210/219
[51] Int. Cl. ............................................ C02c 1/10
[58] Field of Search .................................. 210/3–9, 210/14, 15, 12, 152, 170, 195, 219; 261/92

[56] References Cited
UNITED STATES PATENTS

| 3,421,626 | 1/1969 | Schramm et al. ............ 210/195 X |
| 3,480,144 | 11/1969 | Barth et al. .................. 210/18 X |

FOREIGN PATENTS OR APPLICATIONS

| 608,480 | 11/1960 | Canada .................................. 210/15 |
| 931,024 | 7/1963 | Great Britain ....................... 210/12 |
| 1,282,768 | 12/1961 | France .................................. 210/15 |

*Primary Examiner*—Michael Rogers
*Attorney*—Frederick E. Lange, William C. Babcock and David N. Fronek

[57] ABSTRACT

A combination system and plant includes a sewage treatment conduit in which liquid sewage to be treated is conveyed along an extended continuous loop or re-circulating path, with means for introducing additional sewage at least at one point along the conduit, and with means for feeding at least a portion of the liquid from the conduit through the cooling condensers of an operating plant and back into the sewage treatment conduit. The system includes propulsion and treating means for maintaining at least a minimum rate of flow in the conduit to prevent settling of solids and for aerating the liquid. A plant cooling system pumping means preferably serves as one propulsion means for moving the liquid along through the conduit. The minimum rate can be maintained in case the flow of liquid through the cooling condensers of the power plant is shut down, and the conduit may include connecting means completely or partially bypassing the plant. Liquid in the conduit is aerated both for cooling it to the degree required for reuse in the cooling system and for oxygen enrichment to promote the desired sewage treatment. Liquid is removed from the sewage treatment conduit to settling tanks at a rate substantially equal to the rate of incoming flow of sewage less evaporation and other losses. Bacteria laden sewage solids in the settling tanks are returned to the treatment conduit near the entrance of the original raw sewage entrance. This returned sewage seeds the raw sewage with colonies of active bacteria. The sewage solids will eventually build up to an excess and this excess is later incinerated with the plant fuel, or burned in an individual incinerator, or used for other purposes, e.g., as fertilizer.

17 Claims, 7 Drawing Figures

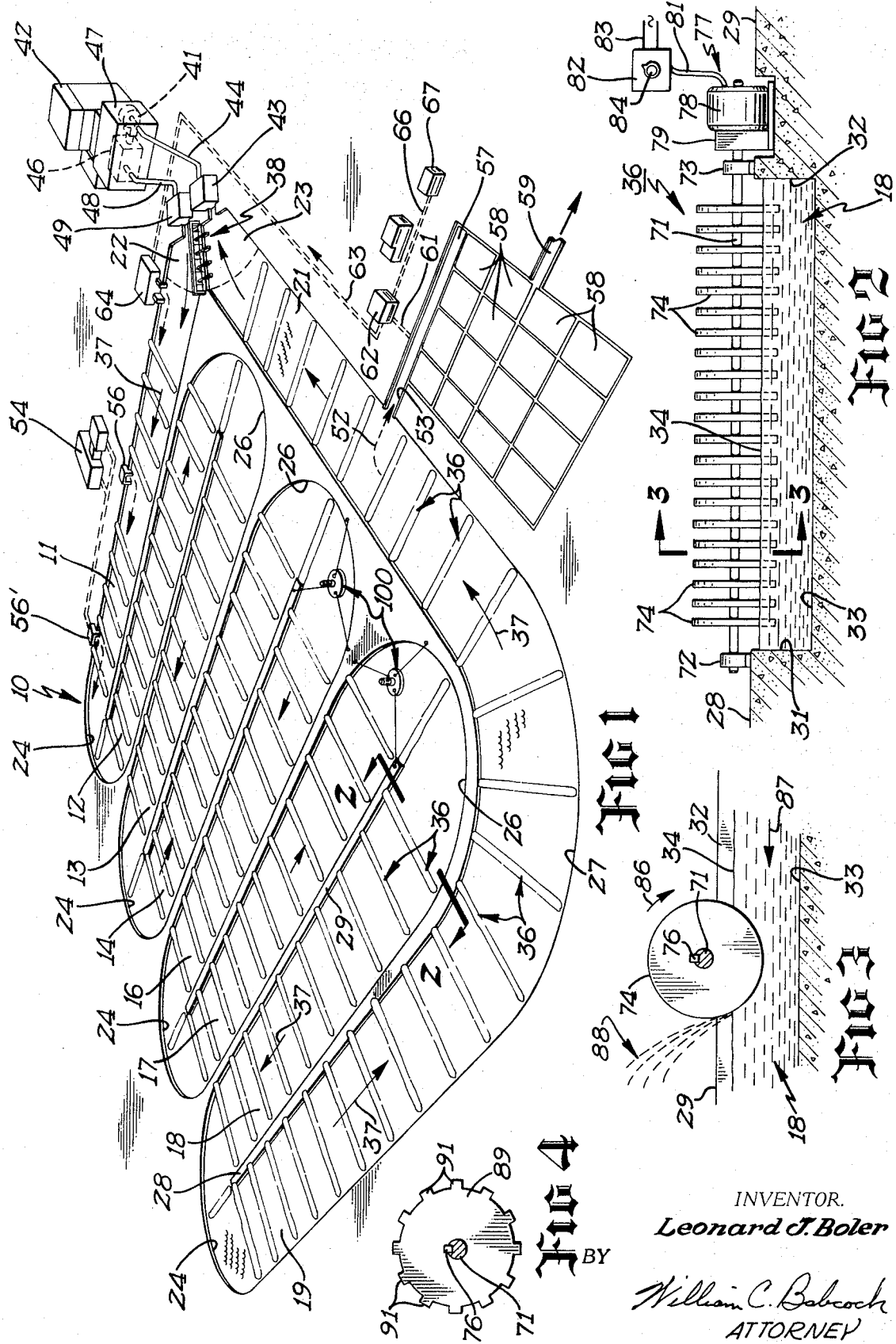

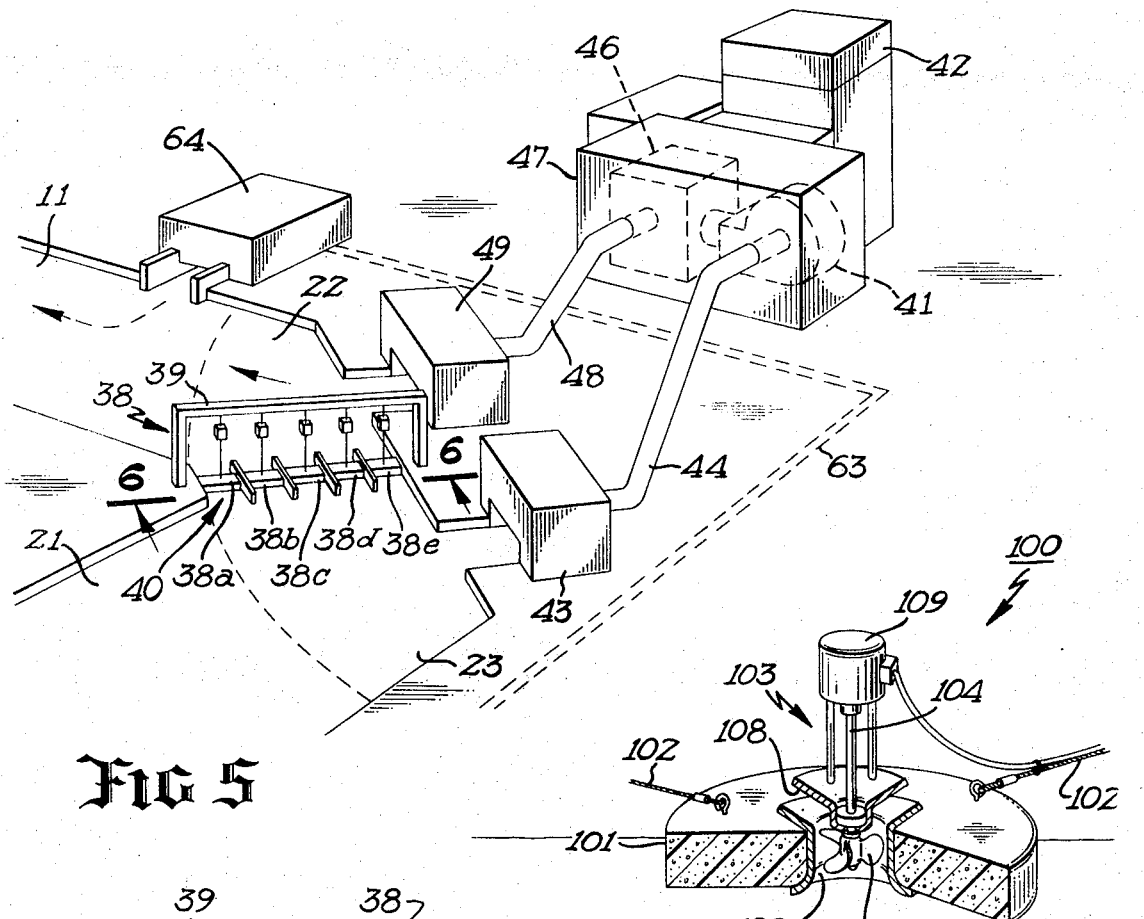
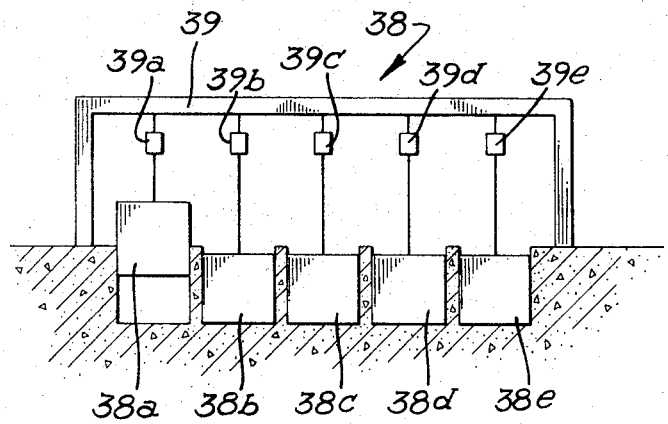

COMBINATION SEWAGE TREATMENT AND COOLING SYSTEM

BACKGROUND OF THE INVENTION

Electric power generating plants, either of the conventional coal or fossil fuel types or the atomic energy type require large volume rates of liquid flow for cooling purposes. Such cooling liquid has previously been obtained from nearby natural waters such as streams and lakes and is often returned to the natural source after use. The use of such liquid for cooling raises its temperature at the point of discharge from such a plant to a higher level than the temperature of the original source. If the higher temperature liquid is then returned to the natural source, there are possibilities, depending upon the particular climate, the nature of the natural source, and other factors, that the higher temperature discharge will have an adverse effect popularly referred to as "thermal pollution." In other cases, proposals have been made for recirculating the liquid through the cooling condensers of the power plant, rather than utilizing it on a "once through" basis and discharging it back into the natural source. Such recirculation requires substantial cooling, and various installations have been proposed for this purpose. One approach has been to use relatively large and expensive cooling towers which introduce a substantial cost factor into the generation of electric power in such a power plant, whether such towers are used for cooling effluent for complete recirculation, or whether they are used to reduce the temperature of the cooling liquid to a low enough level for reintroduction into the natural source. Other proposals involve the use of large cooling ponds into which the heated liquid from the cooling condensers of the plant can be discharged and left to cool. Such cooling ponds require extremely large land areas for effective cooling of the large quantities of water needed for generating plants of substantial size.

There has been at least one suggestion that the heating waters from the cooling condensers of such a plant be used with such a cooling pond after first being fed through a closed type system designed to provide heat for various purposes, such as the raising of the temperature of an area of land for the raising of crops under more favorable temperature conditions, as well as the immersion of such pipes as heating elements in a sewage treatment system to heat the sewage liquid under treatment, while preventing any inter-mixture between the sewage liquid and the heated cooling liquid from the power plant system. Such a system, however, would require extremely extensive piping systems, with inefficient heat transfer through the pipe walls to another liquid or to the ground. Even though some heat would be transferred in this manner, the degree of cooling required for plant cooling systems, especially in electric power generating plants, is so great that additional cooling of the liquid from such a closed pipe system would have to be provided in some way, e.g., by prohibitively expensive extension of the pipe system or by other supplemental means which would add to the cost and space requirements.

SUMMARY OF THE INVENTION

The present invention provides a system and plant installation in which a plant cooling system and a sewage treatment system are combined in a unique way so that the liquid being treated in a sewage treatment conduit is sent directly through the cooling condensers of such a plant. Contrary to the prior suggestion that the respective liquids in a power plant system and a sewage treatment system must not be intermixed in any way, but must be separately piped for a mere heat transfer between them, the present invention recognizes and makes use of the fact that power plant cooling systems, as presently designed, are capable of receiving liquid with suspended solids content as high as 25,000 parts per million (PPM). Activated sludge sewage treatment systems, on the other hand, can function with a substantially lower suspended solids content, in some cases of the order of 3,000 PPM. Thus the invention contemplates the provision of a relatively extended sewage conduit in which a continuous flow of sewage liquid to be treated, sometimes called mixed liquor, is maintained in a relatively long, closed or recirculating path. At some point in this path, all or a portion of the liquid in the sewage treatment conduit is fed directly into the cooling condensers of a power plant where its temperature is increased as the condensers provide the desired heat exchange for dissipation of heat energy from the generating plant itself. The heated cooling liquid, which is also the sewage liquid under treatment, is then restored to the sewage treatment path for further recirculation. The increased temperature resulting from passage through the cooling system enhances the desired bacterial action for sewage treatment in at least that portion of the conduit immediately downstream from the cooling system heated liquid return outlet. During its movement through the sewage treatment conduit, the liquid is subjected to controlled aeration, both for the purpose of evaporative cooling to the extent necessary for recirculation to the plant cooling system, and also for the purpose of increasing its oxygen content and thus enhancing the desired aerobic bacterial action which is an inherent part of such a sewage treatment process. Preferably this aeration is achieved by providing an open-topped long and narrow sewage treatment conduit, which extends in a zigzag or other tortuous path over a relatively large land area and in which a plurality of sewage treatment devices are mounted.

Some of these sewage treatment devices are preferably rotors which may combine the desired propulsion as well as aeration and cooling function. The remainder of these sewage treatment devices do not necessarily propel the liquid but do aerate and cool it. Such devices may be mounted on either floating or fixed supports as needed.

When the power plant is operating, the pumps which force the necessary quantities of cooling liquid through the cooling condensers will effectively serve as propulsion means maintaining a corresponding volume rate of liquid flow along the sewage treatment conduit from the plant cooling system liquid outlet all the way to the plant cooling system liquid intake.

The propulsion rotors are mounted for rotation on axes extending transversely across the conduit. The direction of rotation of such treatment rotors and the immersion of their lower peripheries in the liquid within the sewage treatment conduit are selected so that the lower portion of each rotor urges the liquid in the desired direction of flow, while at the same time the rotors project drops of the liquid up into the atmosphere above the surface of the liquid for the desired evaporative cooling and oxygen enrichment.

The number, size and relative location of these rotors are chosen so that the liquid will be conveyed along he sewage treatment conduit at a rate sufficient to prevent settling out of the solids along the conduit, even if none of the liquid is being pumped from such a conduit through the cooling condensers of the power plant. Hence, the sewage treatment portion of the combination system will continue to function, even if the power plant is shut down or its cooling condensers are closed off. For such situations, the sewage treatment conduit includes a connection portion capable of completely or partially bypassing the power plant cooling system and feeding liquid directly from a first area of the conduit at or near the cooling system liquid intake to a second area of the conduit at or near the cooling system liquid outlet.

Raw sewage to be treated is introduced into the sewage treatment conduit at one or more points spaced along the conduit and downstream from the point at which the heated liquid from the power plant condensers is fed into the system. Such incoming sewage may have a suspended solids content of the order of 200 PPM and may be fed into the system from a city sewage system, after preliminary treatment by particle size reduction and/or screening, at a rate of the order of 200 cubic feet per second. The cooling condensers of the power plant, on the other hand, may require a rate of liquid flow through such plant as high as 2,000 cubic feet per second. Thus, a relatively large volume of liquid will be continuously recirculating through the sewage treatment conduit and power plant cooling condensers at a much higher rate of flow than the incoming flow of additional raw sewage. During the recirculation of this large quantity of liquid, the solids content may build up to 3,000 PPM or higher. As noted, however, the cooling condenser systems of such power plants can accept liquid having solids contents up to 20 to 25,000 PPM, without clogging or other problems. In order to maintain the continuous circulation of this combination system, liquid known as mixed liquor is drawn off from the sewage treatment conduit at some point at a limited rate of flow equal to the incoming rate of flow of raw sewage minus the amounts lost by evaporation during the treatment period. This rate of outflow may be of the order of 160-170 cubic feet per second as compared to an incoming flow of 200 cubic feet per second. This outflow of mixed liquor is fed to appropriate settling tanks where the solids which are suspended in the liquid can settle to the bottom of the tank and be recirculated to the sludge return inlet to the sewage treatment conduit where this sludge is retreated again as it circulates through the system. This recirculating of sludge also provides means by which the solid concentration in the treatment conduit is increased and maintained at the approximate level of 3,000 PPM suspended solids. For optimum operation of such an activated sludge sewage treatment process, this concentration of solids must be kept substantially higher than the level of suspended solids in the incoming raw sewage. Thus the rate of sludge reintroduction is controlled herein in proper relationship to the rate of introduction and suspended solids concentration of the incoming raw sewage.

The clear liquid from the top of the settling tanks can be discharged in any suitable manner, for example, by feeding it back into a stream or other natural source at a temperature and purity nearly equivalent to that of the natural source.

BRIEF DESCRIPTION OF THE DRAWINGS

In the drawings which form a part of this application and in which like reference figures indicate like parts, FIG. 1 is a schematic perspective view of a combination sewage treatment and power plant cooling system according to the invention;

FIG. 2 is a view taken along the lines 2—2 of FIG. 1 showing one form of aerating and conveying means for the sewage treatment conduit of the installation;

FIG. 3 is a view on the lines 3—3 of FIG. 2 showing further details of such means;

FIG. 4 is a view similar to FIG. 3 of a modified element for such conveying means;

FIG. 5 is a partial enlarged view of the power plant portion of FIG. 1 and of the sewage treatment conduit portions adjacent thereto;

FIG. 6 is a sectional view (partly schematic) on the lines 6—6 of FIG. 5; and

FIG. 7 is a partial perspective view, with parts broken away for clarity, of a modified treatment means for aeration of liquid in the sewage conduit without substantial propulsion effect on such liquid.

DESCRIPTION OF THE PREFERRED EMBODIMENTS

As shown in FIG. 1, the combination sewage treatment and power plant cooling system of the present invention includes an extended sewage treatment conduit indicated generally at 10 which extends in a zigzag or tortuous path over a substantial area to provide a relatively long path through which liquid sewage material to be treated may be conveyed for aerobic biological treatment. Thus the sewage treatment conduit 10 is shown as including a series of parallel sections 11, 12, 13, 14, 16, 17, 18 and 19 through which liquid sewage is fed in alternate directions in a continuous path, and a return conduit section 21 connected to conduit section 19 and bringing the total conduit path back to the starting end of the section 11. The upstream end 22 of the first sewage treatment conduit section 11 is immediately adjacent the downstream end 23 of the return section 21 of the conduit, and these areas are joined by a connecting portion of the conduit as further described below.

Appropriate end wall sections 24 provide a suitable connection between the parallel sections 11 through 19 at one end thereof, while similar curved end wall section 26 connect the opposite ends of these parallel conduit sections to provide the desired zigzag continuous flow path. A curved conduit section 27 similarly connects the last parallel conduit section 19 to the return section 21.

As shown in FIGS. 1 and 2, the partitions between the various conduit sections may be in the form of relatively broad flat service roads or paths as indicated at 28 and 29. Thus the sewage treatment conduit section 18 is defined between a side wall 31 extending downwardly from the service path area 28 and a side wall 32 extending from the service area 29. The bottom 33 extends between walls 31 and 32 and thus provides a conduit section 18 within which sewage treatment liquid may flow longitudinally to the conduit. Such liquid may have a normal level or a variable depth as indicated by the liquid level line 34, and the total cross-section area of this conduit is sufficient to provide for movement of the quantities of the liquid necessary for plant cooling purposes as described below, and to provide the surface area adequate for both suitable evaporative cooling of the liquid and oxygenation thereof to enhance the aerobic bacterial treatment of the sewage.

According to one feature of the invention, the elongated sewage treatment conduit is provided with suitable propulsion and treating means 36 for insuring continuous movement of the sewage treatment liquid in the desired path along the conduit as indicated by arrows 37, and for aerating the liquid. Specific examples of such means are illustrated in FIGS. 2, 3 and 4. This propulsion means must insure movement of the liquid at a rate sufficient to prevent the settling out of the suspended solids, under operating conditions in which the means 36 is the only means providing conveying movement to the fluid under treatment. Such minimum rate is of the order of 1 foot per second.

In some conditions of operation of the invention, it is desirable to conenct the downstream end 23 of conduit section 21 directly to the upstream end 22 of the conduit section 11 so that the liquid under treatment can be recirculated in a continuous path or closed loop made up by the various conduit sections. Under other conditions of operation, it is a feature of this invention to convey at least a portion of the liquid under treatment from the downstream end 23 of conduit section 21 directly through the cooling condensers of a suitable electric power generating plant or other operating plant and then reintroduce such liquid as it leaves such condensers into the upstream end 22 of conduit section 11. To accomplish these different conditions of operation, the invention provides a connecting portion of section 40 in conduit 10, which directly connects the first area 23 at the downstream end of conduit section 21 to the second area 22 at the upstream end of conduit section 11. According to the invention, the closing or partial or complete opening of connecting portion 40 is selectively regulated by adjustable flow control means illustrated as a gate 38, having a plurality of gate members 38a, b, c, d and e, respectively. As shown in FIG. 6, each gate member is individually movable between a lower closed position and any selected partly or fully raised open position. For this purpose, an overhead support 39 carries separate power means shown schematically at 39a, b, c, d and e for each respective gate member.

When all members of gate 38, for example, are moved to their upper fully open positions, then all of the sewage liquid passing through the downstream end 23 of conduit section 21 could pass directly through connecting portion 40 into the upstream end 22 of the first conduit section 11 for recirculation around the closed path. When the gate 38, however, is fully closed then none of the liquid at the downstream end 23 of conduit section 21 can flow directly into area 22 of conduit section 11.

To provide for direct circulation of liquid from the sewage treatment conduit through the cooling condenser system of an operating plant 42 (FIGS. 1 and 5) the plant cooling system is provided with a cooling system liquid intake at 43 which can draw sewage liquid from the area 23 of conduit leg 21. From intake 43, the liquid is piped as shown schematically at 44 to the cooling system pumping means 41 and cooling condensers 46, in a condenser building 47 of power plant 42. From cooling condensers 46, the sewage liquid is then conveyed as shown at 48 to a cooling system liquid outlet 49 which discharges the liquid into the upstream end 22 of conduit section 11. Gate 38 will normally be closed when the sewage liquid is being circulated through the cooling condensers. Thus the condenser pumping means 41 will serve as a primary propulsion means for moving the liquid along the treatment conduit all the way from area 22 through sections 11, 12, 13, 14, 16, 17, 18, 19 and 21 back to area 23. If gate 38 were open, this propulsion effect would not be achieved.

At the rates of flow required for power plant cooling, pumping means 41 may draw liquid from area 23 and return it to area 22 in sufficient quantities to cause a difference in liquid levels of as much as 3 feet between these areas, with gate 38 closed.

On the other hand, if plant 42 is shut down so that no liquid is pumped through condensers 46, and if gate 38 remained closed, the movement of liquid throughout conduit 10 would come to a halt and suspended solids could settle out in conduit 10. Thus the provision of selectively movable gate 38 makes it possible to bypass the power plant and maintain at least a desired minimum rate of flow throughout the conduit to prevent such settling. By provision of the further propulsion means 36 in the treatment conduit itself, a desired rate of movement can be maintained to insure proper operation of the sewage treatment part of the combined system even when the plant cooling system is shut down.

Thus a key feature of the present invention is the discovery and recognition that sewage liquid under aerobic biological treatment, can be circulated directly through the cooling condensers of an electric power generating plant or other operating plant to receive heat dissipated during the operation of the plant and thereby provide the desired cooling action for the power plant, while at the same time raising the temperature of the sewage liquid to enhance its bacterial purification. This heated sewage liquid is then recirculated to the remainder of the sewage treatment conduit, where its aerobic biological treatment continues during each passage through the conduit.

The cooling water condenser systems of typical power plants are equipped with appropriate means to handle liquids having solids contents as high as 20,000 to 25,000 parts per million (PPM).

In most conditions of operation, however, the solids content of the sewage liquid or mixed liquor of such a sewage treatment system will not build up substantially beyond the range of 3,000 PPM which is well within the 20,000 or so PPM which can be accepted by the condenser system of such a plant.

By combination of such an aerobic biological treatment system such as the source of cooling liquid for the cooling condensers of a power plant, various advantages are obtained. The cooling and aerating functions are combined into the same equipment and plant. This results in operating and capital cost advantage over the present separate facilities concept. The temperature of the sewage liquid, i.e., mixed liquor, is necessarily increased to some degree as the liquid flows through the cooling condensers of the power plant. An increase in temperature of such liquid has advantages both in accelerating the effectiveness of the aerobic biological treatment through the remainder of the system, and also in preventing freezing of liquid in the sewage treatment conduit in cold climates. Moreover, the pumping means 41, which is included in the condenser building 47 to pump the liquid through the cooling condensers, must necessarily maintain a relatively high volume rate of flow of liquid, which may be of the order of 2,000 cubic feet per second through the power plant, depending upon the size of the plant. This high volume rate of flow draws the sewage liquid from the downstream end 23 of the conduit section 21 and restores the liquid at the same rate to the upstream end 22 of the conduit section 11. Thus the action of the power plant cooling system insures a relatively high rate of flow of the liquid throughout the sewage treatment conduit 10, when the power plant is in operation. At the same time, the operation of the purpulsion and treatment means 36, spaced at appropriate intervals throughout the sewage treatment conduit, prevents the creation of any dead spots or areas of slow flow in the conduit which would permit solids to settle out to the bottom of the conduit without continuing their movement and their aerobic biological treatment.

If the power plant is shut down for any reason, gate 38 can be moved to fully or partly open position so that the sewage liquid will then be recirculated solely within the open-topped outdoor portion of the sewage treatment conduit by the propulsion means 36. One or more of the gate members 38 a,b,c,d and e may be fully or partly closed to meter or modulate the rate of flow and to adjust such rate as desired, relative to the desired degree of aeration established by units 36 and/or separate aeration means as further described below.

The supply of raw sewage to the treatment system shown in FIG. 1 is provided from a municipal sewage system in which the raw sewage may be initially screened and comminuted if necessary, in a preliminary treatment building 54, and is then fed through one or more raw sewage delivery outlets 56, 56' into the first section 11 of the treatment conduit 10. Such incoming raw sewage, with a suspended solids content of the order of 200 PPM, could be introduced at only one point. However, it is preferable to spread it out and introduce it to the system at a plurality of such outlets. The raw sewage outlets are located downstream from the hot water outlet 49 of the power plant cooling system. Thus, the freshly introduced raw sewage will be mixed with the relatively hot sewage treatment liquid which is being recirculated from the power plant and from the remainder of the sewage treatment system. Since the rate of raw sewage introduction is of the order of 200 cubic feet per second from a municipal sewage system capable of handling a population of 1,000,000 persons, and since the rate of circulation through the power plant cooling systems may need to be as high as 2,000 cubic feet per second, the relative volume rates of flow will insure relatively thorough mixing of the incoming raw sewage with the recirculated mixed liquor so that the fresh raw sewage is rapidly dispersed. Thus the relatively smaller amount of fresh raw sewage will be brought up to a higher temperature by such intermixture, to enhance the aerobic biological action in the remainder of the conduit. At the same time, the introduction of this raw sewage will provide a portion of the cooling effect which is desired for the recirculated hot liquid, in order that such liquid may ultimately be recooled sufficiently by the time it reaches the downstream end 23 of the sewage treatment conduit, to insure satisfactory cooling when the liquid again passes through the cooling condensers 46 of the power plant. The specific selection of one or more sewage delivery outlet points can be made with reference to the relative temperatures and relative concentrations of suspended solids in the raw sewage as compared to the treated liquid already in the treatment conduit at different points.

To complete the sewage treatment process, a discharge conduit for the treated mixed liquor is provided at some suitable point along the continuous conduit 10, as shown at 52 in the final conduit section 21. The flow rate through this discharge conduit 52 may be controlled by a movable gate or other valve means 52 which can be adjusted to determine the rate at which treated liquid reaches the distribution channel 57 and from that channel is fed into appropriate sludge settling tanks 58 of known construction. In such settling tanks, the suspended sludge solids are permitted to settle to the bottom of the tank, and the clear or purified water is removed from the tops of the tanks. As is illustrated in FIG. 1 the purified water outlet is at 59.

Such settling tanks provide a final clarification or purification systems which can produce a relatively clear final effluent of sufficient purity to restore it to a nearby stream or other natural waters, without substantial risk of pollution. Moreover, the temperature of such clear liquid, after standing for the necessary time in such settling tanks, will have reached a point at which the liquid can be returned to such natural waters without adverse thermal pollution. If additional cooling is desirable, separate aerating units can be included in the purified water discharge channel 59 for further evaporative cooling.

Location of the discharge conduit 52 in the final leg 21 of the continuous sewage treatment conduit 10 provides a lower temperature for the liquid at the point of such removal than would be the case if outlet 52 were located farther upstream. The location of this outlet, however, is not as critical as the specific location of the raw sewage inlet close to but downstream from the hot water return point 49 from the power plant 42.

From the settling tanks 58, the settled sludge provides a concentrated sludge dispersion which may be removed at 61 to a sludge return pump building 62. From this point, sludge may either be pumped through line 63 to a sludge return outlet 64 at the upstream end of the first sewage treatment conduit leg 11, or sludge may be moved at 66 to a final processing or removal point 67, for use as fertilizer or for other purposes. Such sludge can even be burned with the fossil fuel, if plant 42 is one which operates on such fuel.

In continuous operation of the system of FIG. 1, there will be some evaporation and other losses as the sewage liquid moves around conduit 10. Some of the evaporation losses are provided in a controlled manner to insure sufficient cooling of the liquid so that it will be at a proper temperature for recirculation at the cold water intake 43 for the plant condensers. In any event, the control gate or valve 53 for the sludge settling system will be controlled to provide a volume rate of discharge from the conduit 10 at this point 52 which is equal to the rate of introduction of raw sewage at the inlets 56, 56' minus the evaporation loss and any other losses. In a typical installation of the type shown in FIG. 1, it is expected that raw sewage will be introduced at a rate approximating 200 cubic feet per second. The removal of liquid at point 52 would then be at a volume rate of approximately 160 to 170 cubic feet per second.

Various forms of propulsion means 36 may be provided to insure the desired minimum conveying action for the liquid in conduit 10. As illustrated in FIGS. 1, 2 and 3, however, a plurality of combination propulsion and aerating means 36 are provided in the form of sewage treatment rotors, each extending horizontally across the conduit 10 and each mounted for rotation on a substantially horizontal axis. Thus, rotor 36 in FIG. 2 has a main rotary shaft 71 which extends across the conduit section 18 and is supported in bearings 72 and 73 at the respective service road areas 28 and 29. Shaft 71 carries a plurality of rotor members, illustrated as circular plates or disks 74, each extending in a plane perpendicular to the shaft 71. Each rotor member is keyed or otherwise secured, as shown at 76 in FIG. 3, to shaft 71 so that the rotor member will rotate with the shaft. The relative dimensions of the rotor plates are such that the lower portions of each plate will extend downwardly from shaft 71 below the liquid level 34 in the conduit section 18.

Shaft 71 is rotated by a suitable power unit 77, which is illustrated as including an electric motor portion 78 and a gear box 79. Motor 78 may be a variable-speed motor and is connected at 81 to a speed-control unit 82 and in turn to appropriate electric current supply wires 83. A manually operable rheostat of knob 84 on unit 82 provides for selective adjustment of the rate of rotation of shaft 71 and rotor members 74 depending on such factors as the ambient temperature or other climatic conditions, whether or not the sewage treatment liquid is being recirculated only in the sewage treatment conduit or is being fed through the condensers 46 of the power plant, the rate of raw sewage input, and other factors. Othr motor means, such as hydraulically powered motors could be used in place of electric motors 78.

As illustrated in FIG. 3, the invention contemplates the use of a rotor member which provides both a conveying action and a suitable aerating effect. Thus the frictional engagement of the immersed portions of rotors 74 within the liquid in conduit 18, and the rotation of the rotor in the direction of arrow 86 in FIG. 3 will cause movement of the liquid in conduit section 18 in the direction of arrow 87, FIG. 3.

At the same time, depending on the speed of rotation of member 74, the frictional engagement of the edge portions of this member within the liquid will tend to project particles or drops of the liquid upwardly into the atmosphere above the surface 34 of the liquid at 88 on the downstream side of rotor 74. Relatively higher speeds of rotation will project the particles relatively higher into the air and will thus increase the time in which the particles or drops are exposed to the atmosphere. During this exposure, two things take place. One is the partial evaporation of liquid from the drop which will produce a cooling effect, the other effect, through exposure of the drop to air is the absorption of oxygen by the drop from the air.

According to the invention, it is possible to control the relative degrees of evaporative cooling on the one hand, and oxygen enrichment, on the other hand, by variation in the speed of rotation of shaft 71. Thus, we have found that increased exposure of the drops to the atmosphere, resulting from higher speeds of rotation of rotor 74, will increase the extent of the evaporative cooling of the drops. Since this type of aeration is taking place throughout the sewage treatment conduit at each rotor location, an increase in the rotor speeds will thus provide a substantial increase in the effective cooling of the liquid as it passes along the conduit. At the same time, however, we have found that oxygen is picked up rapidly by the drops only in the first moments of exposure and apparently primarily at the surface of the drops. Thus, the surface is saturated at the start of the projection, and continued passage of the drop through the atmosphere as a result of greater projection effect may not substantially increase the oxygen absorption. Thus, adjustment of the speed of rotation of rotor members 74 can selectively vary the relative evaporative cooling and oxygen enrichment effects of the treatment process.

Other forms of propulsion and treating means may be used according to the invention, provided both a propulsion effect and an aeration effect are achieved in one way or another. Preferably, according to the invention, both these effects are at least partly achieved by combination propulsion and treating units, in which various forms of such rotor members can be designed. The alternate embodiment shown in FIG. 4 involves a plurality of circular disks 89 keyed at 76 to shaft 71 in the same manner described in connection with the example of FIG. 3. In this case, to enhance the projecting effect which is obtained in the FIG. 3 device primarily by frictional engagement of liquid against the smooth circumferential periphery and the smooth side surfaces of the lower immersed portions of disk 74, the disks 89 are shown with a series of peripheral projections 91 which may take the form of simple teeth or cross-members. These may have the same lateral thickness as plates 89, or a greater or lesser lateral dimension, as desired.

Other forms of aeration units may also be used. In FIG. 7, for example, an aeration unit 100 is shown in which a float 101 may be positioned by holding lines 102 at any desired location on the surface of liquid in conduits 10, 53 or 59. Two such units are shown at the ends of conduit legs 16 and 17 in FIG. 1, but the relative number of such units may be selected to achieve the desired degree of aeration. Float 101 supports an aerating pump 103 which includes a vertical drive shaft 104 in a vertical pumping conduit 106. An impeller 107 on shaft 104 below the water level is rotated to force liquid upwardly through conduit 106. Outwardly and upwardly flaring guide surfaces 108 at the top of conduit 106 direct the fluid in an upwardly and outwardly diverging spray for evaporative cooling and oxygen absorption. Impeller shaft 104 is driven by a motor 109 supported above the water level.

By use of a plurality of aeration spray units 100 in combination with the propulsion and treatment units 36, further control of the relative propulsion and cooling functions can be achieved. Spray units 100 provide no propulsion effect and can accordingly be operated solely to obtain increased aeration without increasing the rate of flow through the sewage treatment conduit. Rotor units 36, on the other hand, may be rotated at different speeds, or the number of such units 36 in operation at one time may be changed, to provide different desired propulsion rates, as well as desired differences in the relative propulsion and aeration effects.

In the specific installation shown in FIG. 1, which is designed for a sewage plant serving a population center of 1,000,000 persons and for a power plant having a power output of 1,000 megawatts, the sewage treatment conduit is designed to extend over an area roughly 2,000 feet by 2,000 feet, with a conduit width sufficient to accommodate transversely extending rotor units 36 approximately 240 feet long. The effective depth of the open-topped conduit should be approximately 72 inches. The disk diameters should be 30 inches.

With such a system, and with appropriate control of the effective rotary speed of the rotor members, continuous sewage treatment and power plant cooling can be achieved by selection of operation conditions in which the sewage liquid will be heated to the range of 80° to 110° F. for enhanced bacterial action, but will not be heated above a temperature at which the aerobic bacteria will be destroyed or their action inhibited. Under summer conditions, the raw sewage entering the system at points 56, 56' may have a temperature of the order of 55° F., while in winter, the temperature of such sewage may be as low as 44° to 47° F. During the winter, in the northern hemisphere, the solar input of heat to the liquid in the conduit is decreased, so that less evaporative cooling is needed and the rotor action can be slower. Similarly, in winter, there may be greater normal cooling effect at the surface of the liquid due to the colder atmosphere, so that less evaporative cooling is needed.

It should be apparent to those skilled in the art that the selection of particular propulsion and aerating means, as well as the relative numbers of such units of the same or different types, and the various dimensions and details of construction of the installation shown in the drawings could be modified in many ways without departure from the principles and teachings of the present invention. For example, the combination propulsion and aerating rotors of FIGS. 2, 3 and 4 may be supported on floats (as exemplified in connection with the aerating device of FIG. 7) in those sections of conduit 10 where any substantial variations in liquid level are expected, for example as a result of the volume rate of pumping from area 23 to area 22 described above. Thus such rotors can be maintained at their most effective operating depth with respect to the variable liquid level in the conduit. Conversely, the aerating units of FIG. 7 may be mounted on fixed supports (as exemplified in connection with the propulsion and aerating rotors of FIG. 2), in those cases where the expected liquid level variations or the exact nature of such aerating units may not require a floating support. Also, the economies of combining both sewage treatment and power plant cooling in a single conduit or lagoon area can be achieved with other relative sizes of power plants and sewage plants and with variations in the total sizes, shapes and relative locations of the various sections. The present specification, however, sets forth some of the ways in which the invention may be put into practice, including the best mode presently contemplated for carrying out this invention.

What is claimed is:

1. A combination raw sewage treatment and plant cooling system comprising an operating plant cooling system liquid intake, an operating plant cooling system liquid outlet, an open-topped liquid-carrying raw sewage treatment conduit extending horizontally and longitudinally over a substantial area adjacent to said outlet and intake for guiding a stream of liquid from said plant outlet along a relatively extended longitudinal path to said plant intake, a raw municipal sewage delivery line having a sewage outlet discharging raw sewage into said treatment conduit, and a plurality of separate propulsion and treating means spaced from each other along the path and thereby providing propulsion of the liquid along said path and aeration of the liquid for cooling and oxygen enrichment thereof without substantial settling out of suspended solids.

2. A combination sewage treatment and cooling system according to claim 1 in which the propulsion and treating means comprises operating plant pumping means maintaining a volume rate of flow from the plant intake to the plant outlet at a level providing desired cooling temperatures in the cooling system.

3. A combination sewage treatent and cooling system according to claim 1 in which the propulsion and treating means comprises a plurality of aeration units in the treatment conduit spaced along said path.

4. A combination sewage treatment and cooling system according to claim 1 in which said propulsion and treating means comprises a plurality of combination propulsion and aeration units in the treatment conduit spaced along said path.

5. A combination raw sewage treatment and plant cooling system comprising an operating plant cooling system liquid intake, an operating plant cooling system liquid outlet, a liquid-carrying raw sewage treatment conduit for guiding a stream of liquid from said plant outlet along a relatively extended longitudinal path to said plant intake, a raw municipal sewage delivery line having a sewage outlet discharging raw sewage into said treatment conduit, and propulsion and treating means providing propulsion of the liquid along said path and aeration of the liquid for cooling and oxygen enrichment thereof without substantial settling out of suspended solids, the sewage treatment conduit including a selectively regulatable connecting section extending directly between first and second areas of the sewage treatment conduit at said plant intake and plant outlet respectively, for selectively recirculating at least part of the liquid from said intake area to said outlet area without passage of that part of the liquid through the plant cooling system.

6. A combination sewage treatment and cooling system according to claim 5 in which the propulsion and treating means comprises a plurality of propulsion units in the raw sewage treatment conduit spaced along the said path and having a capacity maintaining a volume rate of flow preventing substantial settling out of suspended solids whenever all of the liquid is recirculated through the connecting section from said first area to said second area without passing through the plant cooling system.

7. A combination raw sewage treatment and power plant cooling unit comprising a power plant cooling system cold liquid intake, a power plant cooling system hot liquid outlet, a liquid-carrying activated sludge raw sewage treatment conduit extending over a substantial area adjacent to said outlet and intake for guiding a stream of liquid from said hot liquid outlet along a relatively extended longitudinal path to said cold liquid intake, a municipal sewage delivery line having a sewage outlet discharging raw sewage including suspended solids into said treatment conduit at a location close to said power plant hot liquid outlet and downstream therefrom, liquid removal means having a discharge conduit receiving liquid from said treatment channel, a sludge settling unit into which liquid is fed from the discharge conduit and in which clear effluent is separated from sludge for discharge, a connecting conduit section for recirculating at least part of the liquid from a first area of the treatment conduit at the plant cold liquid intake directly to a second area of the conduit at the plant hot liquid outlet without passage of that part of the liquid through the power plant, flow control means selectively controlling the flow of liquid through said connecting section and power plant cooling unit, and propulsion and treating means in the treatment conduit providing propulsion of the liquid along said path and aeration of the liquid for cooling and oxygen enrichment thereof without substantial settling out of suspended solids.

8. A combination unit according to claim 7 in which said propulsion and treating means includes a plurality of combination propulsion and aeration units spaced along said conduit, each such unit including at least one rotor member, bearing means supporting the rotor member for rotation on a substantially horizontal axis extending transversely of said treatment conduit with the lower portion of the rotor at least partly immersed in the liquid in said conduit, and motor means driving each rotor member in a direction in which said lower portion of each rotor is immersed in liquid material carried by said conduit and moves in a direction of rotation urging liquid along said conduit toward said cold water intake.

9. A combination sewage treatment and cooling unit according to claim 8 having control means for adjusting the speed of operation of said motor means and rotor members and thereby varying the effective propulsion and aeration of liquid in said conduit.

10. A combination sewage treatment and cooling unit according to claim 8 in which each rotor member comprises a plurality of circular plates perpendicular to and concentric with said axis.

11. A combination sewage treatment and cooling unit according to claim 10 in which each circular plate has a smooth circumferential periphery.

12. A combination sewage treatment and cooling unit according to claim 10 in which each circular plate has a plurality of liquid projecting surfaces around its circumferential periphery.

13. A combination sewage treatment and cooling unit according to claim 7 having means for feeding sludge from said settling unit back to said treatment conduit for reintroduction of such sludge therein at a rate maintaining the suspended solids content at a desired sewage treatment level.

14. A combination raw sewage treatment and plant cooling system comprising an operating plant cooling system liquid intake, an operating plant cooling system liquid outlet, a liquid-carrying raw sewage treatment conduit for guiding a stream of liquid from said plant outlet along a relatively extending longitudinal path to said plant intake, a raw municipal sewage delivery line having a sewage outlet discharging raw sewage into said treatment conduit, and propulsion and treating means providing propulsion of the liquid along said path and aeration of the liquid for cooling and oxygen enrichment thereof without substantial settling out of suspended solids, said propulsion and treating means comprising a plurality of combination aerating and cooling units spaced along the treatment conduit, each such unit including aerating means for controlled exposure of the liquid to air while the liquid moves along said conduit toward said liquid intake, cooling means for projecting drops of liquid upwardly above the conduit, and means for varying the relative effectiveness of the respective aerating and cooling means.

15. A combination sewage treatment and plant cooling system comprising an operating plant cooling system liquid intake, an operating plant cooling system liquid outlet, a liquid-carrying treatment conduit for guiding a stream of liquid from said plant outlet along a relatively extended longitudinal path to said plant intake, a sewage delivery line having a sewage outlet discharging raw sewage into said treatment conduit, and propulsion and treating means providing propulsion of the liquid along said path and aeration of the liquid for cooling and oxygen enrichment thereof without substantial settling out of suspended solids, the sewage treatment conduit including a connecting section extending directly between first and second areas of the sewage treatment conduit at said plant intake and plant outlet respectively, for recirculating at least part of the liquid from said intake area to said outlet area without passage of that part of the liquid through the plant cooling system, and the connecting section of the treatment conduit including adjustable gate means selectively movable between open and closed positions respectively permitting and preventing the flow of liquid through the connecting section.

16. A combination sewage treatment and power plant cooling unit comprising a power plant cooling system cold liquid intake, a power plant cooling system hot liquid outlet, a liquid-carrying sewage treatment conduit extending over a substantial area adjacent to said outlet and intake for guiding a stream of liquid from said hot liquid outlet along a relatively extended longitudinal path to said cold liquid intake, a sewage delivery line having a sewage outlet discharging raw sewage including suspended solids into said treatment conduit at a location close to said power plant hot liquid outlet and downstream therefrom, liquid removal means having a discharge conduit receiving liquid from said treatment channel, a sludge settling unit into which liquid is fed from the discharge conduit and in which clear effluent is separated from sludge for discharge, and propulsion and treating means in the treatment conduit providing propulsion of the liquid along said path and aeration of the liquid for cooling and oxygen enrichment thereof without substantial settling out of suspended solids, a connecting conduit section for recirculating at least part of the liquid from a first area of the treatment conduit at the plant cold liquid intake directly to a second area of the conduit at the plant hot liquid outlet without passage of that part of the liquid through the power plant, and flow control means including adjustable gate means controlling the flow of liquid through said connecting system.

17. A combination sewage treatment and cooling unit according to claim 14 in which the means for feeding sludge maintains the suspended solids content in the treatment conduit at a level which is substantially higher than the suspended solids content of the original raw municipal sewage.

* * * * *